US008228823B2

(12) United States Patent
Tallet et al.

(10) Patent No.: US 8,228,823 B2
(45) Date of Patent: Jul. 24, 2012

(54) AVOIDING HIGH-SPEED NETWORK PARTITIONS IN FAVOR OF LOW-SPEED LINKS

(75) Inventors: Francois Edouard Tallet, Santa Clara, CA (US); Norman W. Finn, Livermore, CA (US); Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 12/628,739

(22) Filed: Dec. 1, 2009

(65) Prior Publication Data

US 2011/0128892 A1   Jun. 2, 2011

(51) Int. Cl.
 *H04L 12/28* (2006.01)
(52) U.S. Cl. ........................................................ 370/256
(58) Field of Classification Search .................. None
See application file for complete search history.

(56) References Cited

U.S. PATENT DOCUMENTS

| | | | |
|---|---|---|---|
| 5,926,463 A * | 7/1999 | Ahearn et al. | 370/254 |
| 6,724,734 B1 * | 4/2004 | Shabtay et al. | 370/254 |
| 6,813,250 B1 * | 11/2004 | Fine et al. | 370/256 |
| 6,934,262 B1 * | 8/2005 | Lau et al. | 370/256 |
| 7,054,277 B1 * | 5/2006 | Lau et al. | 370/256 |
| 7,180,899 B2 | 2/2007 | De Silva et al. | |
| 7,224,697 B2 * | 5/2007 | Banerjea et al. | 370/401 |
| 7,268,690 B2 | 9/2007 | Nguyen et al. | |
| 7,447,147 B2 | 11/2008 | Nguyen et al. | |
| 7,480,258 B1 | 1/2009 | Shuen et al. | |
| 7,499,456 B2 | 3/2009 | De Silva et al. | |
| 7,515,535 B2 | 4/2009 | Finn | |
| 7,606,178 B2 | 10/2009 | Rahman et al. | |
| 7,653,011 B2 * | 1/2010 | Rahman et al. | 370/256 |
| 2003/0065816 A1 * | 4/2003 | Dharmadhikari et al. | 709/240 |
| 2004/0085896 A1 * | 5/2004 | Banerjea et al. | 370/228 |
| 2005/0213134 A1 * | 9/2005 | Chikuma et al. | 358/1.13 |
| 2006/0198323 A1 | 9/2006 | Finn | |
| 2006/0268747 A1 * | 11/2006 | van Haalen et al. | 370/256 |
| 2007/0291707 A1 * | 12/2007 | Fischer et al. | 370/338 |
| 2009/0274054 A1 * | 11/2009 | Wakumoto et al. | 370/242 |
| 2011/0044346 A1 * | 2/2011 | Mueller et al. | 370/401 |

\* cited by examiner

*Primary Examiner* — Gary Mui
*Assistant Examiner* — Hicham Foud
(74) *Attorney, Agent, or Firm* — Cesari and McKenna, LLP (57) ABSTRACT

In one embodiment, each network interface of a network device in a computer network may be classified as either a low-speed interface (e.g., wireless) or a high-speed interface (e.g., wired). Illustratively, then, low-speed interfaces may be configured (identified) as external interfaces to external links and high-speed interfaces may be configured (identified) as internal interfaces to internal links. By executing a multiple spanning tree (MST) protocol at the network device with other network devices in the computer network, network devices interconnected with internal links are in a same MST region and internal links within an MST region are preferred over external links between MST regions.

19 Claims, 5 Drawing Sheets

AVOIDING HIGH-SPEED NETWORK PARTITIONS IN FAVOR OF LOW-SPEED LINKS

TECHNICAL FIELD

The present disclosure relates generally to computer networks, and, more particularly, to spanning tree protocols (STPs) having high-speed and low-speed links.

BACKGROUND

In a network comprising high-speed and low-speed links (e.g., local area networks or "LANs" in a bridged network), with no additional configuration, spanning tree protocols may make sub-optimal decisions when deciding to block a redundant port. For example, assume two buildings that each separately have wired links between their respective devices, where the buildings themselves are separated by wireless links. If a root bridge in one building is connected wirelessly (e.g., via a wireless access point) to each of two bridges "A" and "B" in the other building (that are connected to each other via a wired connection), then by default, the spanning tree algorithm will block the link is between A and B, regardless of their wired connection. As such, the high-speed network between the two bridges A and B is partitioned in favor of the slow-speed links, even if the high-speed wired link might have a thousand times grater bandwidth than the low-speed wireless uplinks to the root.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, each network interface of a network device in a computer network may be classified as either a low-speed interface (e.g., wireless) or a high-speed interface (e.g., wired). Illustratively, then, low-speed interfaces may be configured (identified) as external interfaces to external links and high-speed interfaces may be configured (identified) as internal interfaces to internal links. By executing a multiple spanning tree (MST) protocol at the network device with other network devices in the computer network, network devices interconnected with internal links are in a same MST region and internal links within an MST region are preferred over external links between MST regions.

Description

Network Architecture

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a switch (or bridge) may be used to provide a "switching" (or "bridging") function between two or more LANs. Typically, the switch is a computer and includes a plurality of ports that are coupled to the LANs. Ports that are coupled to LANs that are, in turn, coupled to other switches are generally referred to as a trunk ports, whereas ports used to couple switches through LANs to end stations are generally referred to as access ports. The switching function includes receiving data from a sending entity at a source port and transferring that data to at least one destination port for forwarding to a receiving entity.

Although bridges/switches may operate at various levels of the communication protocol stack, they typically operate at Layer-2, which, in the OSI Reference Model, is called the data link layer and includes the Logical Link Control (LLC) and Media Access is Control (MAC) sub-layers. Data frames at the data link layer typically include a header containing the MAC address of the entity sourcing the message, referred to as the source address, and the MAC address of the entity to which the message is being sent, referred to as the destination address. To perform the switching function, Layer-2 switches examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

Figure 1:
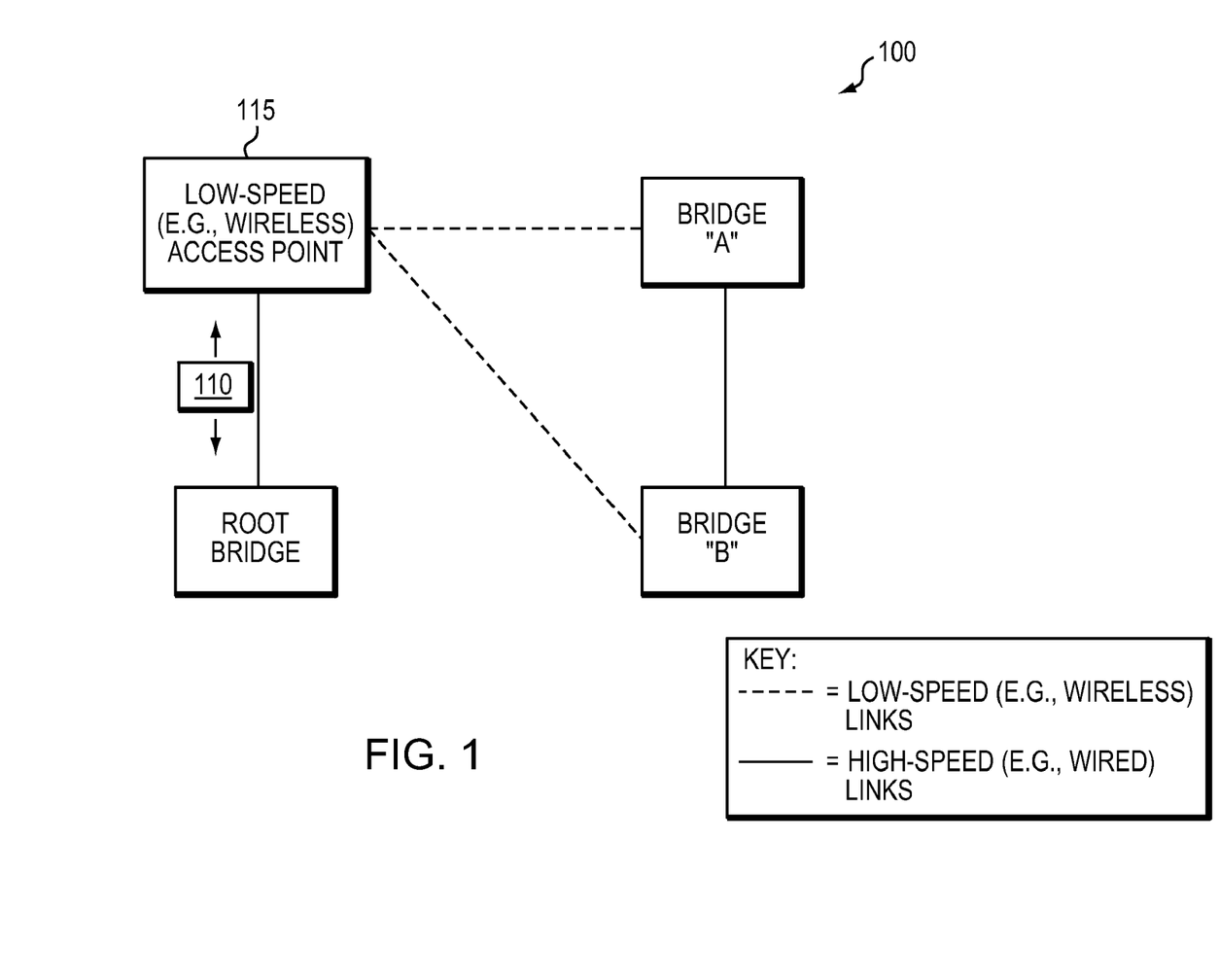
FIG. 1 illustrates an example computer network.

FIG. 1 is a schematic block diagram of an example computer network 100 illustratively comprising network nodes/devices, such as a root bridge (or switch) interconnected to two other bridges "A" and "B" via a low-speed access point (e.g., illustratively a wireless access point) 115 as shown. Notably, as described further herein, dashed lines represent illustrative low-speed links, while solid lines represent illustrative high-speed links. The network of bridges may be used to interconnect one or more other devices or other portions of the network 100 (not shown). The network devices may be any suitable device with dual connectivity (high-speed and low-speed) to a network (e.g., with a bridging function, mentioned below), such as computers/PCs, servers, printers, IP-phones, etc., or even audio/video bridging equipment, such as televisions, stereo equipment, and so on. Notably, any number of nodes, devices, links, etc. may be used in the computer network, and the view shown herein is for simplicity. The computer network 100 of FIG. 1 is meant for illustration purposes only and is not meant to limit the embodiments described herein.

Figure 2:
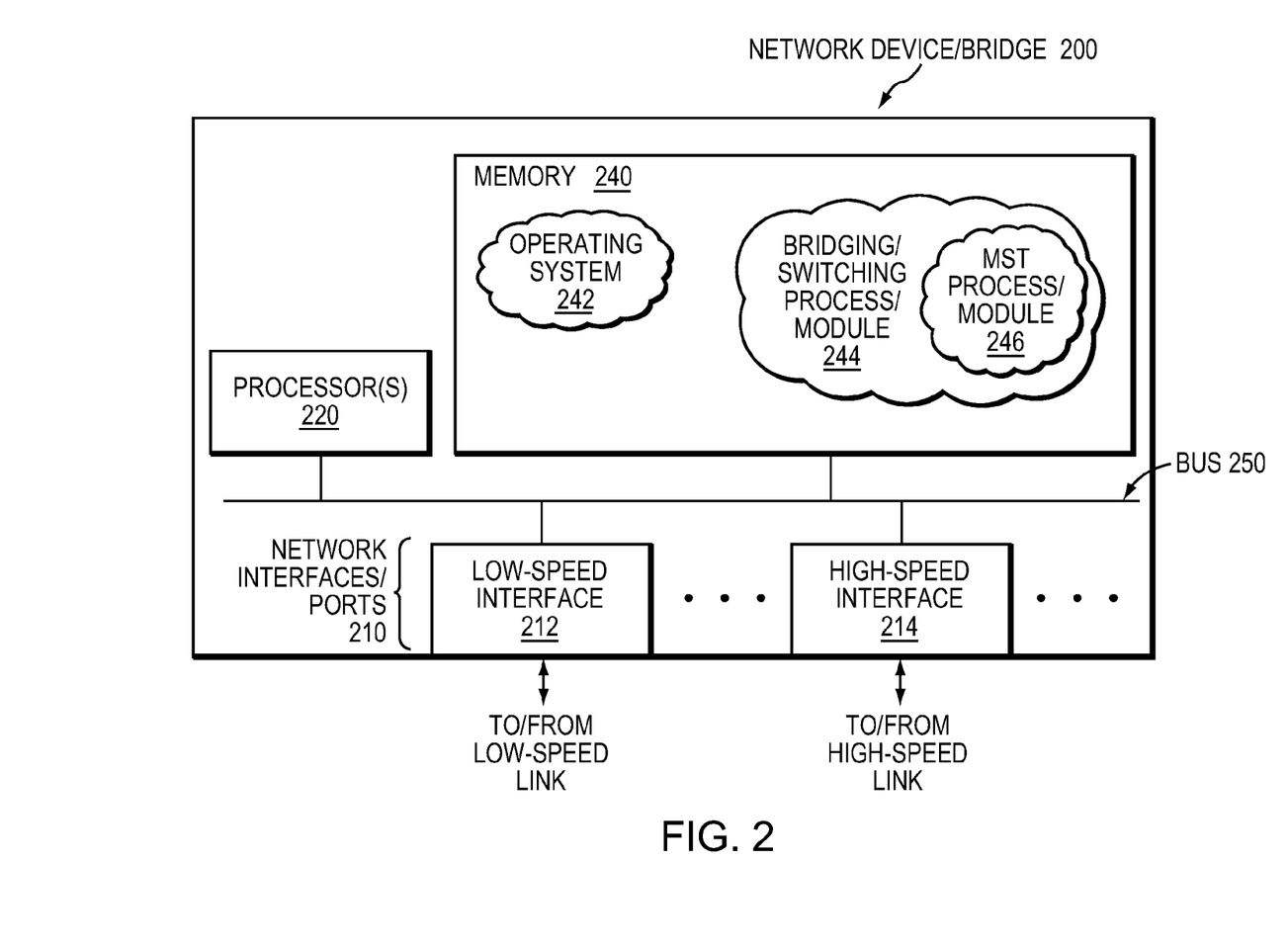
FIG. 2 illustrates an example network device/node.

FIG. 2 is a schematic block diagram of an example network node/device 200 that may be advantageously used with one or more embodiments described herein, e.g., as a bridge (or switch). The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100. The network interfaces/ports may be configured to transmit and/or receive data (frames 110 in FIG. 1) using a variety of different communication protocols over physical (wired) links or wireless links, for instance with the communication with other bridges in the network 100. For example, such communication protocols may include, inter alia, TCP/IP, UDP, ATM, synchronous optical networks (SONET), wireless protocols (e.g., IEEE Std. 802.11 or 802.16), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames within the network interfaces/ports 210 may conform to a protocol stack that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and processes and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. It will be apparent to those skilled in the art that other types of processors and memory, including various computer-readable media, may be used to store and execute program instructions pertaining to the inventive technique described herein.

Portions of the device 200 may be organized as particular components or modules that are configured to perform various processes and/or services for the device. For instance, these components or modules may be hardware, software, firmware, logic (e.g., on an application-specific integrated circuit or "ASIC"), etc., depending upon implementation and functionality, as may be appreciated by those skilled in the art. For example, certain processes and/or services as used herein may comprise an illustratively simplified bridging module/process (or switching module/process) 244, along with an illustrative MST module/process 246, as described herein (both shown stored/executed within memory 240 as one example implementation).

Bridging module/process 244 contains computer executable instructions executed by the processor(s) 220 to perform various functions relating to bridges (or switches). For instance, a communication process/service of switching module a process 244 may perform functions provided by one or more communication protocols, such as various switching/ bridging protocols. These functions may be configured to manage switching databases (e.g., spanning tree instances), filtering databases (FDBs), or forwarding information databases (FIBs) containing, e.g., data used to make switching/forwarding decisions. In particular, as part of communication process/services, a spanning tree process may execute to perform functions provided by one or more spanning tree protocols (STPs), such as the known Rapid STP (RSTP) and/or Multiple STP (MST), which transmit bridge protocol data units (BPDUs), e.g., frames 110, to determine a shared network topology.

Illustratively, RSTP and MST may be employed on the network devices (bridges) to establish and maintain one or more spanning tree instances, converging the network in response to topology changes. STPs may be used to manage loop-free layer-2 network topologies. In particular, the Multiple Spanning Tree (MST) protocol, illustratively handled by MST process 246, is an enhanced STP that allows for a plurality of "instances," where each instance has its own network topology. VLANs may then be mapped to a particular instance, and all bridges/switches that share that mapping are considered to be within the same "region." One example MST protocol is defined by the is known IEEE Std. 802.1Q.

Figure 3:
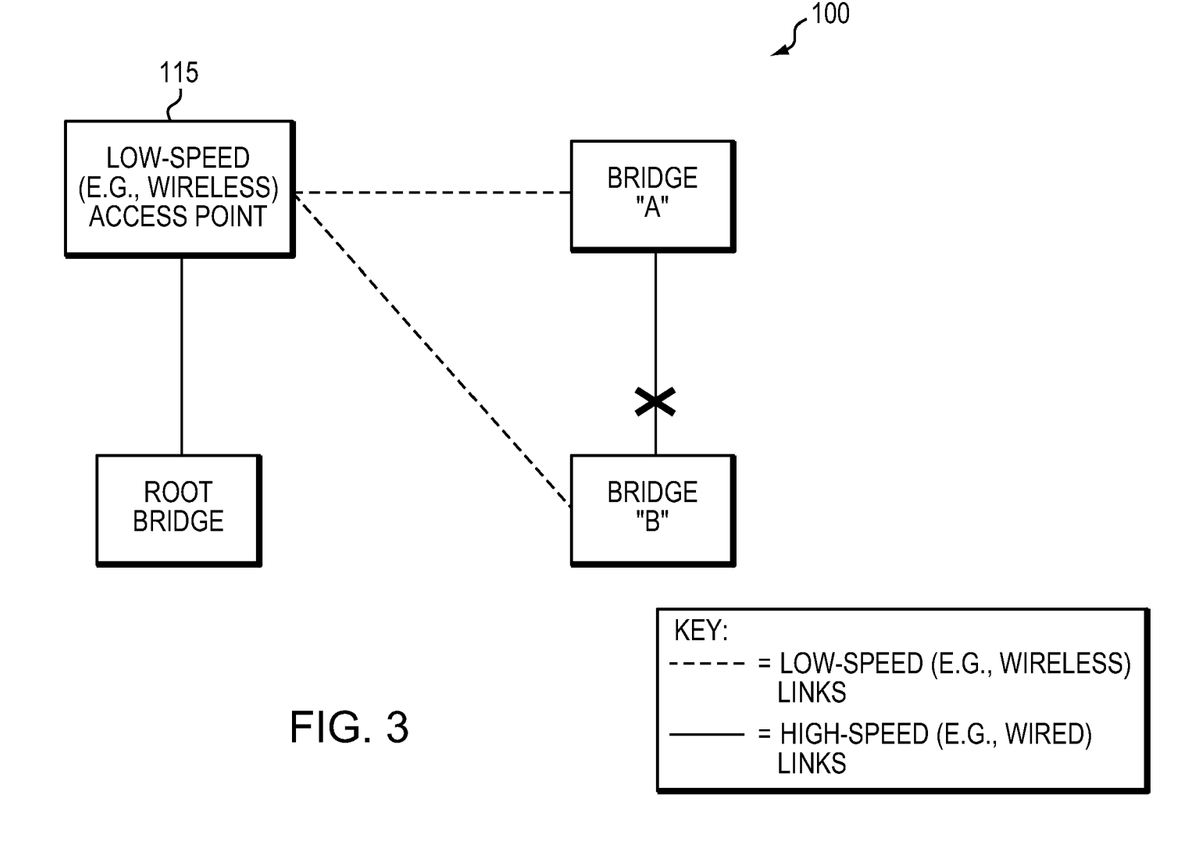
FIG. 3 illustrates an example computer network having a partitioned high-speed network.

As noted above, networks may comprise high-speed and low-speed links (e.g., LANs in a bridged network). In this situation, spanning tree protocols often make sub-optimal decisions when blocking links to avoid loops. Assume, for example, that as described above FIG. 1 represents two physically separated buildings: a first building having the root bridge and the access point, and a second building having bridges A and B. Within each building, the network devices are illustratively interconnected with high-speed links, such as wired links (e.g., Gigabit Ethernet links), while between the two buildings, each bridge A and B are connected via a slow-speed links, such as comparatively slow wired links (e.g., T1) or wireless links (i.e., where the access point is a wireless access point). In this situation, as shown in FIG. 3, the spanning tree algorithm will block the high-speed link between bridges A and B, thus partitioning the high-speed network between the two bridges in favor of the slow-speed links. As such, for bridge A and bridge B to communicate with each other (that is, for hosts communicating data between bridge A and bridge B), the data traffic must traverse the wireless links to/from the access point between the buildings (i.e., the best path to the root bridge), rather than using their directly connecting high-speed link.

Avoiding High-Speed Network Partitioning

According to one or more embodiments of the disclosure, each network interface of a network device (e.g., bridge 200) in a computer network may be classified as either a low-speed interface or a high-speed interface. The STP executing at the network device is then configured to prefer interconnections on high-speed interfaces over low-speed interfaces. Specifically, in an illustrative embodiment, the multiple spanning tree (MST) protocol is used, and low-speed interfaces are configured as external interfaces to external links, while high-speed interfaces are configured as internal interfaces to internal links. As such, by executing the MST protocol, network devices interconnected with internal links are in a same MST region and internal links within an MST region are preferred over external links between MST regions.

The techniques described herein, therefore, provide a plug-and-play mechanism to is ensure that high-speed links (e.g., wired) are always preferred, when available, over low-speed links (e.g., wireless), regardless of the root bridge location or other spanning tree parameters. Illustratively, the techniques described herein may be performed by hardware, software, and/or firmware, such as in accordance with MST process 246, which may contain computer executable instructions executed by the processor 220 to perform functions relating to the novel techniques described herein, e.g., in conjunction with bridging process 244 operating in a conventional manner.

Operationally, the techniques illustratively utilize the concept of a "region" introduced by the MST protocol (e.g., IEEE Std. 802.1Q), where all bridges in the network have the same default MST configuration. First, each network interface/port 210 of a network device is classified as either a low-speed interface (212) or a high-speed interface (214). Low-speed versus high-speed is a matter of configuration, and may change as newer technologies arise. Current example low-speed versus high-speed interfaces may be wireless interfaces as low-speed interfaces versus wired interfaces as high-speed interfaces, or low-speed wired interfaces versus high-speed wired interfaces (e.g., T1 versus Gigabit Ethernet), etc. Notably, while this classification may be indicated manually (e.g., administrator configuration on the device), it may also be dynamically detected whether an interface of the network device is a low-speed interface or a high-speed interface (e.g., based on an interface "type" known locally to the device, such as knowing or otherwise distinguishing between wireless and wired interfaces).

Based on the classifications, low-speed interfaces may be configured as external interfaces to external links and any high-speed interfaces may be configured as internal interfaces to internal links (e.g., using MST auto-configure based on the interface types). For instance, in the example, above (FIGS. 1 and 3), any low-speed (e.g., wireless) link is considered an external link, even if the MST protocol indicates that it is an internal link, while any high-speed (e.g., wired) link uses the standard MST protocol. While BPDUs are transmitted and received in the network without distinction as to whether the BPDUs are carried on low-speed interfaces or high-speed interfaces, the devices receiving the BPDUs on a low-speed interface may tag the BPDU as external information. BPDUs are generally considered internal or external based on their content, however, in this instance, their classification is based on the type of interface receiving the BPDU, thus conversely tagging internal BPDUs from high-speed interfaces as well.

Figure 4:
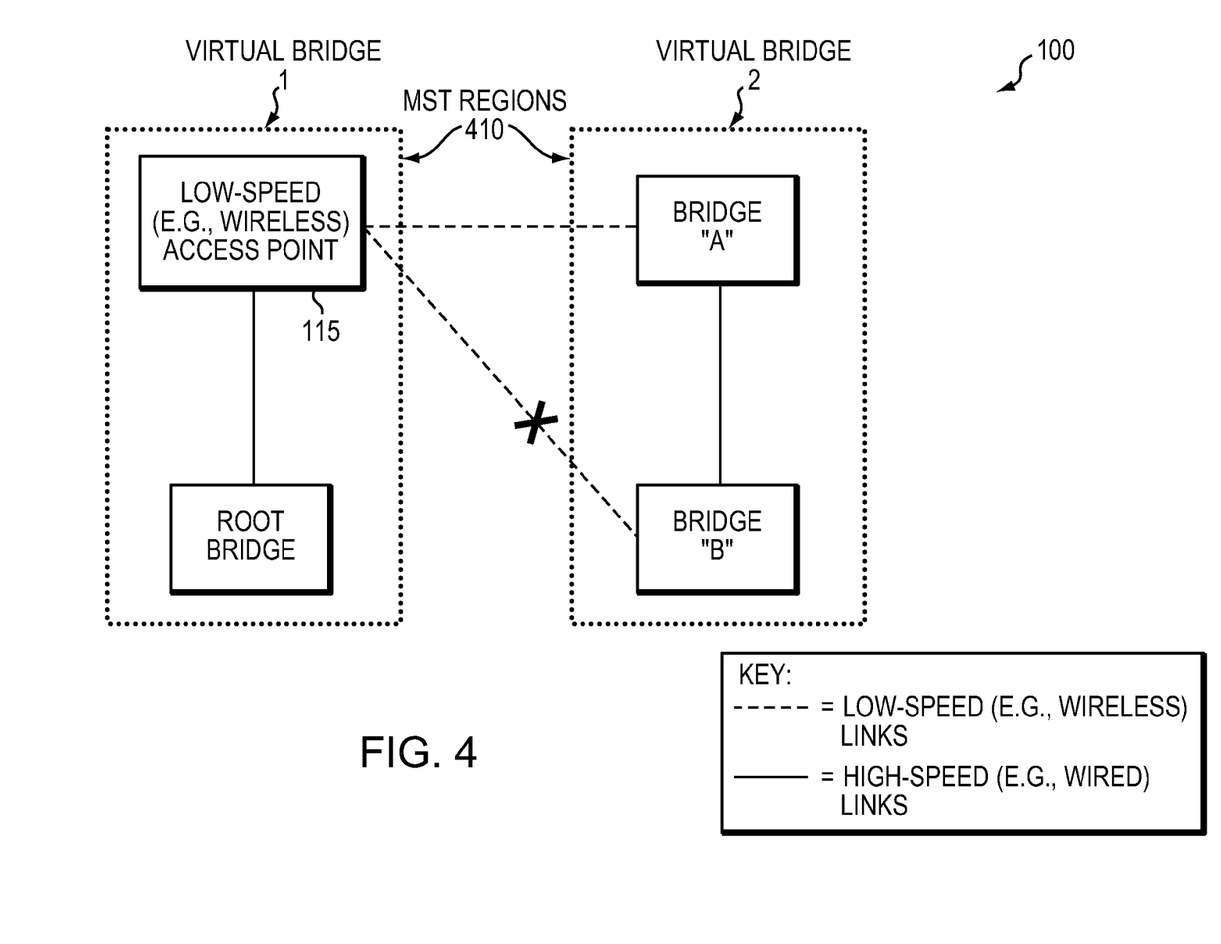
FIG. 4 illustrates an example computer network having a united high-speed network.

By executing the MST protocol at each network device in the network, network devices interconnected with internal links are in (that is, define) a same MST region. In the absence of specific configuration, therefore, any two bridges connected by high-speed links (e.g., "internal" links) are put in the same region with no user intervention, and form a virtual bridge that has low-speed connections (e.g., "external" links). For instance, according to the conventional MST protocol behavior, all bridges that are part of a region appear as (function as) single bridge from outside of the region. This concept is shown in FIG. 4, which illustrates the network of FIGS. 1 and 3 with two established MST regions 410 (virtual bridges 1 and 2). Rather than using MST to identify regions in their typical sense or for managing multiple spanning trees, the techniques above use MST in a unique manner to differentiate between whether an interface is external or internal, i.e., in this case, low-speed versus high-speed.

One property of MST regions is that the forwarding path between two bridges in a given region is entirely included in the region. This implies that so long as there is a high-speed path (one or more links) between any two bridges in the network, this path is always preferred to any path including a low-speed link. This desired property of MST thus dictates that internal links within an MST region (i.e., high-speed links) are preferred over external links (i.e., low-speed links) between MST regions.

As shown in FIG. 4, then, since MST is designed to never block interfaces within a bridge instead of blocking external interfaces, the high-speed links are not blocked in favor of low-speed links, regardless of their best path to the root device. In the example, therefore, bridge A and B are part of the same region (virtual bridge 2), and the two low-speed (e.g., wireless) links to the root bridge are now considered as redundant links between the root bridge and this virtual bridge 2 (MST region 410). As a result, all but one of the low-speed links is put to a discarding (blocked) state, and the link between A and B is in a forwarding (not blocked) state. Accordingly, low-speed (e.g., wireless) links, being considered external links, are used only if they provide the only connectivity, e.g., as the only link between the two buildings or to a device that does not have a high-speed connection (e.g., a station that is not a bridge).

Notably, MST continues to operate in a generally conventional manner based on the external versus internal configuration of the interfaces (i.e., in accordance with the embodiments described herein), and may respond to changes in the network topology, accordingly. For instance, assume that the high-speed link between bridge A and bridge B fails somehow. STP (MST process) will detect the fault, and reconfigure network forwarding to provide connectivity between bridge A and bridge B (specifically, between bridge B and the root bridge). Referring again to FIG. 3, then, the blocked interface in this example represents the failed link, and bridge B may be interconnected to the spanning tree (to the root bridge) via the low-speed (e.g., wireless) access point. If the high-speed (internal) link between bridge A and bridge B is later restored, then the virtual bridge 2 is again operable, and the low-speed link to bridge B is blocked to allow high-speed traffic between bridge A and B (again, FIG. 4).

Figure 5:
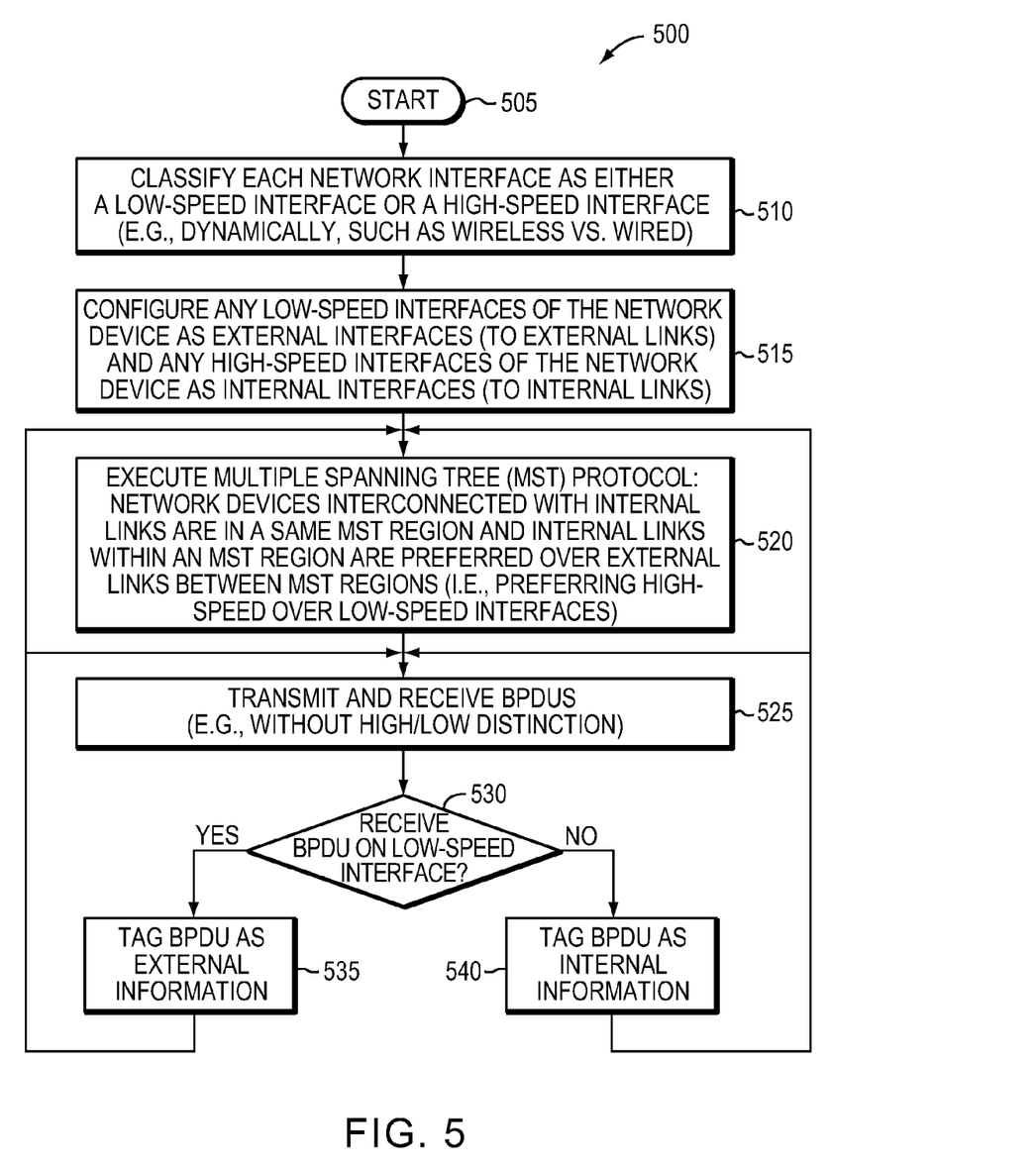
FIG. 5 illustrates an example procedure for avoiding high-speed network partition in favor of low-speed links.

FIG. 5 illustrates a simplified example procedure for prevent partitioning a high-speed network in favor of low-speed links in accordance with one or more embodiments described herein. The procedure 500 starts at step 505, and continues to step 510, where each network interface 210 is classified as either a low-speed interface 212 or a high-speed interface 214, such as dynamically based on an interface type (e.g., wireless vs. wired, slow wired vs. fast wired, etc.) as mentioned above. In step 515 the low-speed interfaces 212 of the network device may be configured as external interfaces (to external links), while high-speed interfaces 214 of the network device are configured as internal interfaces (to internal links), if necessary.

In step 520, the MST protocol operations may be executed in accordance with the interface classification/configuration. Specifically, as described above, network devices interconnected with internal links are in a same MST region 410 and internal links within an MST region are preferred over external links between MST regions (i.e., preferring high-speed over low-speed interfaces). In this manner, as in the example above, is redundant low-speed links (e.g., wireless) are blocked, allowing for devices interconnected with high-speed links (e.g., wired) are allowed to directly communicate over the high-speed links, accordingly.

Notably, during the course of MST protocol operations, BPDUs 110 (e.g., without high/low distinction) may be transmitted and received in step 525. In response to receiving a BPDU on a low-speed interface in step 530, the BPDU is tagged in step 535 as external information. Conversely, in response to receiving a BPDU on a high-speed interface in step 530, the BPDU is tagged in step 535 as internal information (e.g., or alternatively stated, accepted as internal information). The procedure 500 may return to either step 520 (operating the MST protocol) or 525 (transmitting or receiving BPDUs), as necessary. Note that in certain instances, the interface classifications may change (e.g., software based speed classifications), in which case the procedure 500 may restart.

Embodiments described herein prevent partitioning a high-speed network in favor of low-speed links in a computer network. By treating low-speed (e.g., wireless) interfaces/links as non-preferred (e.g., external) interfaces for MST, the novel techniques make sure that high-speed (e.g., wired) interfaces/links are always preferred when determining the forwarding topology between devices (i.e., the spanning tree). In particular, the techniques described above allow for the use of the MST protocol in a bridge network comprising both wireless and wired links effectively, where the solution is able to interact with existing MST protocol implementations (e.g., layer-2 redundancy, Audio Video Bridging, etc.). Further, the techniques herein do not adversely affect fast convergence (e.g., do not use timers), do not result in temporary loops, and have a minimal processing/memory requirement (and do not require changes to the data/control plane), regardless of the topology of the network or the type of devices. Moreover, the dynamic aspects of one or more embodiments described herein alleviate the need for cumbersome and inefficient manual configuration (e.g., a typical requirement for Audio Video Bridging).

While there have been shown and described illustrative embodiments that prevent partitioning a high-speed network in favor of low-speed links in a computer network, it is is to be understood that various other adaptations and modifications may be made within the spirit and scope of the embodiments herein. For example, the embodiments have been shown and described herein with relation to particular standards and protocols (e.g., STP, MST, BPDUs, particular types of devices, etc.). However, the embodiments of the invention in their broader sense are not so limited, and may, in fact, be used with any suitable technology, as may be appreciated by those skilled in the art. Also, since the MST regions may be treated as virtual bridges, any known techniques available to virtual bridges may be used between the MST regions, such as aggregation (e.g., an aggregation protocol used to aggregate multiple wireless links), etc. Moreover, while wireless links have generally not been described as high-speed links, the techniques above may equally apply to varying speed wireless protocols, such a high-speed wireless protocol versus a low-speed wireless protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    classifying one or more network interfaces of a network device in a computer network as low-speed interfaces;
    classifying one or more network interfaces of the network device as high-speed interfaces;
    configuring low-speed interfaces as external interfaces to external links and high-speed interfaces as internal interfaces to internal links; and
    executing a multiple spanning tree (MST) protocol at the network device, wherein interconnections with internal links are in a same MST region and internal links within an MST region are preferred over external links between MST regions.

2. The method as in claim 1, wherein classifying comprises:
    dynamically detecting whether an interface of the network device is a low-speed interface; and
    dynamically detecting whether an interface of the network device is a high-speed interface.

3. The method as in claim 1, wherein classifying comprises:
    manually indicating whether an interface of the network device is a low-speed interface or a high-speed interface.

4. The method as in claim 1, wherein classifying comprises:
    identifying wireless interfaces as low-speed interfaces.

5. The method as in claim 1, wherein classifying comprises:
    identifying wired interfaces as high-speed interfaces.

6. The method as in claim 1, wherein classifying comprises:
    identifying low-speed wired interfaces as low-speed interfaces; and
    identifying high-speed wired interfaces as high-speed interfaces.

7. The method as in claim 1, further comprising:
    transmitting and receiving bridge protocol data units (BPDUs) without distinction as to whether the BPDUs are carried on low-speed interfaces or high-speed interfaces.

8. The method as in claim 7, further comprising:
    receiving a BPDU on a low-speed interface of the network device; and
    tagging the BPDU as external information.

9. The method as in claim 1, wherein the network device is a bridge.

10. The method as in claim 9, wherein MST regions are virtual bridges.

11. The method as in claim 1, wherein the MST protocol is defined by an IEEE 802.1Q standard.

12. The method as in claim 1, wherein all other network devices in the computer network share an MST configuration with the network device.

13. The method as in claim 1, wherein a first MST region corresponds to a first physical location having an MST protocol root device, a second MST region corresponds to a second physical location, and a plurality of low-speed links interconnect the first and second MST regions.

14. The method as in claim 13, further comprising:
    blocking, via the MST protocol, all but one low-speed link interconnecting the first and second MST regions.

15. An apparatus, comprising:
    one or more network interfaces to communicate in a computer network, each network interface classified as either a low-speed interface or a high-speed interface;
    a processor coupled to the network interfaces and adapted to execute one or more processes;

a memory; and a multiple spanning tree (MST) module configured to: configure any low-speed interfaces of the network interfaces as external interfaces to external links and any high-speed interfaces of the network interfaces as internal interfaces to internal links; and participate in an MST protocol with other network devices in the computer network, wherein network devices interconnected with internal links are in a same MST region and internal links within an MST region are preferred over external links between MST regions.

16. The apparatus as in claim 15, wherein the MST module is further configured to:

classify the network interfaces by dynamically detecting whether a network interface is a low-speed interface or a high-speed interface.

17. The apparatus as in claim 15, wherein the network interfaces are either wireless or wired interfaces, any wireless interfaces being classified as low-speed interfaces and any wired interfaces being classified as high-speed interfaces.

18. The apparatus as in claim 15, wherein the MST module is further configured to:

receive a bridge protocol data unit (BPDU) on a low-speed interface; and tag the BPDU as external information.

19. A method, comprising:

classifying each network interface of a network device in a computer network as either a low-speed interface or a high-speed interface;

configuring any low-speed interfaces of the network device as external interfaces to external links and any high-speed interfaces of the network device as internal interfaces to internal links; and executing a multiple spanning tree (MST) protocol at the network device, wherein network devices interconnected with internal links are placed in a same MST region and internal links within a MST region are preferred by the MST protocol over external links between MST regions s.

\* \* \* \* \*

UNITED STATES PATENT AND TRADEMARK OFFICE
CERTIFICATE OF CORRECTION

PATENT NO. : 8,228,823 B2  Page 1 of 1
APPLICATION NO. : 12/628739
DATED : July 24, 2012
INVENTOR(S) : Francois Edouard Tallet et al.

It is certified that error appears in the above-identified patent and that said Letters Patent is hereby corrected as shown below:

Col. 1, line 25 should read: "algorithm will block the link is between A and B, regardless"

Col. 2, line 32 should read: "and Media Access is Control (MAC) sub-layers. Data frames"

Col. 4, line 23 should read: "MST protocol is defined by the is known IEEE Std. 802.1Q."

Col. 4, line 63 should read: "and-play mechanism to is ensure that high-speed links (e.g.,"

Col. 6, line 57 should read: "above, is redundant low-speed links (e.g., wireless) are"

Col. 10, line 19 should read: "MST regions s."

Signed and Sealed this
Thirteenth Day of November, 2012

David J. Kappos
*Director of the United States Patent and Trademark Office*